United States Patent [19]
Yamamoto

[11] 4,275,466
[45] Jun. 23, 1981

[54] BLOCK SYNC SIGNAL EXTRACTING APPARATUS

[75] Inventor: Kaichi Yamamoto, Zama, Japan

[73] Assignee: Sony Corporation, Tokyo, Japan

[21] Appl. No.: 98,770

[22] Filed: Nov. 29, 1979

[30] Foreign Application Priority Data

Dec. 12, 1978 [JP] Japan ............................. 53-153885

[51] Int. Cl.³ .............................................. H04L 7/06
[52] U.S. Cl. .................................... 375/113; 360/51; 375/108
[58] Field of Search ........................ 328/72, 75, 155; 370/100, 105; 375/111, 113, 108, 114, 116; 360/36, 39, 51; 371/42, 47

[56] References Cited

U.S. PATENT DOCUMENTS

| | | | |
|---|---|---|---|
| 4,145,683 | 3/1979 | Brookhart | 371/42 |
| 4,157,573 | 6/1979 | Aghazadeh et al. | 360/51 |
| 4,202,018 | 5/1980 | Stockham, Jr. | 360/47 |
| 4,215,430 | 7/1980 | Johnson, Jr. | 360/51 |

*Primary Examiner*—Benedict V. Safourek
*Attorney, Agent, or Firm*—Lewis H. Eslinger; Alvin Sinderbrand

[57] ABSTRACT

A sync signal extracting circuit suitable for a digital information processing apparatus, such as a digital video tape recorder, is provided, which can promptly detect an incorrect sync state and which can quickly and accurately recover a correct sync state. The circuit extracts the sync signals or portions from a digital information signal consisting of a plurality of successive blocks, each consisting of N successive bits (where N is an integer) and each having a sync signal or portion consisting of a predetermined sync bit pattern and a data portion. The circuit comprises a sync bit pattern detecting circuit for generating a detected sync signal when it detects the occurrence of the sync bit pattern in the information signal, a counting circuit for providing a count having a successive one of N cyclical count values in response to each successive bit of the information signal and generating a counted sync signal at every Nth bit of the information signal, and a check mode circuit for memorizing the count of the counting circuit when the detected sync signal is generated other than in conjunction with the counted sync signal, for generating a checked sync signal if a detected sync signal is generated the next time the counting circuit equals the memorized count, and for changing the count of the counting circuit in response to the generation of the checked sync signal so that the counting circuit will be synchonized with the detected sync signals which gave rise to the checked sync signal.

9 Claims, 12 Drawing Figures

BLOCK SYNC SIGNAL EXTRACTING APPARATUS

BACKGROUND OF THE INVENTION

1. Field of the Invention

This invention relates to synchronizing, or sync, signal extracting apparatus, such as the apparatus to extract the block sync signals which are used in digital video tape recorders (hereinafter abbreviated as DVTR).

2. Description of the Prior Art

In digital data transmission, data information is usually transmitted together with synchronizing information so that the decoding device which is to receive such data information can properly break that information into the symbolic or pictorial elements of which it is comprised.

In digital data transmission bit synchronization, word synchronization and frame synchronization are all used. Of these forms of synchronization, bit synchronization is not directly related to the present invention and hence discussion of it will be omitted herein. The present invention, however, can be used to achieve either word or frame synchronization, but word synchronization can easily be obtained by counting bits within a given frame once frame synchronization is obtained, and hence does not require further discussion, except to state that when 1 frame is composed of 1 word, synchronization and frame synchronization are the same. This form of synchronization, where one word equals one frame will hereinafter be called block synchronization.

Ideally apparatus for decoding a data transmission that uses block synchronization should be able to quickly recover the timing of the block synchronization whenever such timing is lost, that is it should have good recovery characteristics and it should be able to maintain such timing once obtained in the presence of noise, that is it should have good holding characteristics. Unfortunately these two characteristics are contradictory. In order to improve the probability of accurately detecting the block sync signals, the length of the synchronous bit pattern used to indicate block synchronization may be increased so as to decrease the likelihood that such a synchronous bit pattern will occur as part of the data portion of a digital transmission. But, the use of such lengthened synchronous bit patterns results in a degradation of information transmitting efficiency. As a result of these trade offs, an optimum synchronizing system must be tailored for each of the various kinds of transmission systems.

A variety of systems have been proposed for recovering synchronization timing once such timing has been lost, such as the 1 bit shift system, the reset system, and the block correlating system.

The 1 bit shift system attempts to correct for mis-synchronization by shifting its block synchronization one bit at a time. As a result, it is a its average recovery time is relatively long. This 1 bit shift system is effective for recovering from the slip-off of synchronization of a small number of bits such as might result from clock slip or the like, but it requires the provision of a phase comparator for the purpose of recognizing the direction of the clock slip.

In the reset system, if the synchronous bit pattern is detected at an intermediary portion of the block the system resynchronizes to such synchronous bit pattern.

In the above mentioned 1 bit shift system and the reset system, if the same pattern as the synchronous bit pattern appears in the information sequence, mis-synchronizaton can occur. Such mis-synchronization can be prevented by comparing the timing of all of the block pulses in the course of recovering the correction synchronization. Such a system is the above mentioned block correlating system. This block correlating system is quite effective in detecting the synchronization of information signals being supplied continuously in real time.

In many types of data transmissions, such as in many types of data transmissions between computers, if uncertainty regarding the synchronization in a given portion of data is detected, it is possible to retransmit that portion until it is received with proper synchronization. But in an apparatus for decoding in real time continuously arriving information, such as the video and audio signals handled by a DVTR, data which is not properly synchronized is lost. As a result, such real time decoding apparatus must be provided with synchronization information even if there is doubt about the reliability of that synchronization information because of the possibility of mis-synchronization of drop-out. Furthermore, in DVTRs using a rotary head, the transducers of the DVTRs are transferred from one track to another on the recording tape in rapid succession. As a result, it is necessary to rapidly establish synchronizaton timing on each such track that is scanned by the transducers.

Apparatus for decoding in real time continuously arriving information, such as a DVTR, must have a level of reliability similar to that required for usual data transmission and at the same time have a capability of quickly responding to an error in synchronization when it occurs and of quickly re-establishing proper synchronization.

DVTRs in particular require the ability to quickly detect synchronization errors and to rapidly re-establish proper synchronization, because they reproduce digital video signals from tape. Tape noise, the drop out of synchronous signals and tape jitter all increase the probability synchronization errors. Therefore, without the ability to rapidly correct for such synchronization errors, a large percent of the video information read by such a DVTR would be improperly reproduced.

SUMMARY OF THE INVENTION

It is one of the objects of the invention to provide sync signal extracting apparatus which can detect an incorrect synchronous state promptly and recover a correct synchronous state quickly and accurately.

It is another object of the invention to provide sync signal extracting apparatus which can avoid large-scale transmission errors.

It is a further object of the invention to provide sync signal extracting apparatus suitable for an information processing apparatus such as DVTR which must achieve synchronization with information being received in real time and thus which can achieve or regain synchronization quickly.

It is still a further object of the invention to provide sync signal extracting apparatus suitable for accurately extracting sync signals from digital signals containing noise and missing bits.

In accordance with an aspect of this invention an apparatus is provided for extracting a sync signal from a digital information signal consisting of a plurality of successive blocks each consisting of N successive bits (where N is an integer) and each having a sync portion consisting of a predetermined sync bit pattern and a data portion. The apparatus comprises a sync pattern detecting means for detecting the occurrence of the sync bit pattern in the information signal and for generating a detected sync signal upon the detection of such an occurrence; a counting means for providing a count having a successive one of N cyclical count values in response to each successive bit of the information signal and for generating a counted sync signal every time the count of the counting means has a predetermined one of its count values; and check mode means for memorizing the count of the counting means when the detected sync signal is generated other than in conjunction with the generation of the counted sync signal, for generating a checked sync signal when a subsequent detected sync signal is generated the next time after such a memorization that the count of the counting means equals the memorized count, and for changing the count in the counting means when such a checked sync signal is generated so that the counted sync signal will be generated after the counting of each N successive bits of the information signal which follows the detected sync signal that gives rise to such a checked sync signal.

It is a further feature of the invention that it includes means for generating block sync signals suitable for use by a decoding appratus which also receives the information signal. The means for generating block sync signals generates such block sync signals in response to the gernation of counted sync signals and in response to the generation fo checked sync signals. The apparatus may further include an information top search means for detecting the beginning of a digital information signal within a succession of digital bits in response to the first detected sync signal generated in response to a given succession bits.

The above, and other objects, features, and advantages of the inbention will be apparent in the following detailed description of illustrative embodiments of the invention which is to be read in connection with the accompanying drawings.

DETAILED DESCRIPTION OF THE PREFERRED EMBODIMENTS

Figure 1:
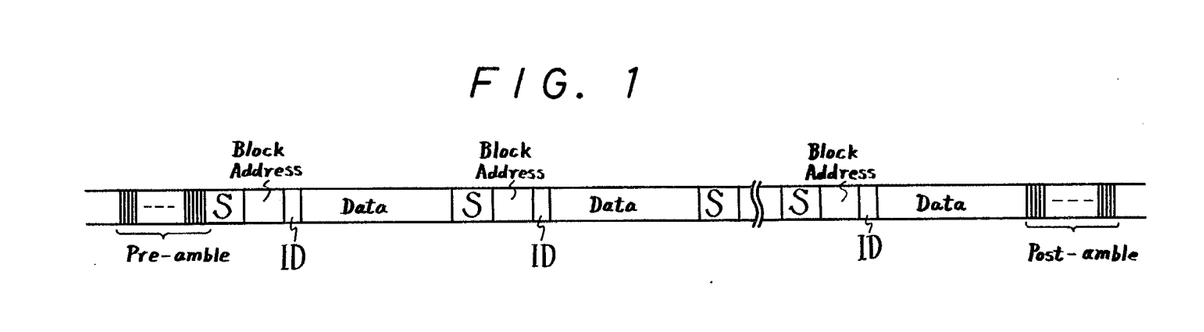
FIG. 1 shows a data format for a digital video tape recorder (DVTR)

FIG. 1 shows a data format for a track of recorded video information suitable for reproduction by a rotary head DVTR. The transducer of a rotary head DVTR scans a succession of such tracks to reproduce a continuous video signal.

When the reading of data is transferred from one track to another, the sequence is interrupted. The track is provided at its front end with a preamble and at its rear end a post-amble as shown in FIG. 1. In FIG. 1, S designates a synchronizing, or sync, pattern and ID designates a discriminating code which identifies every block.

Figure 2:
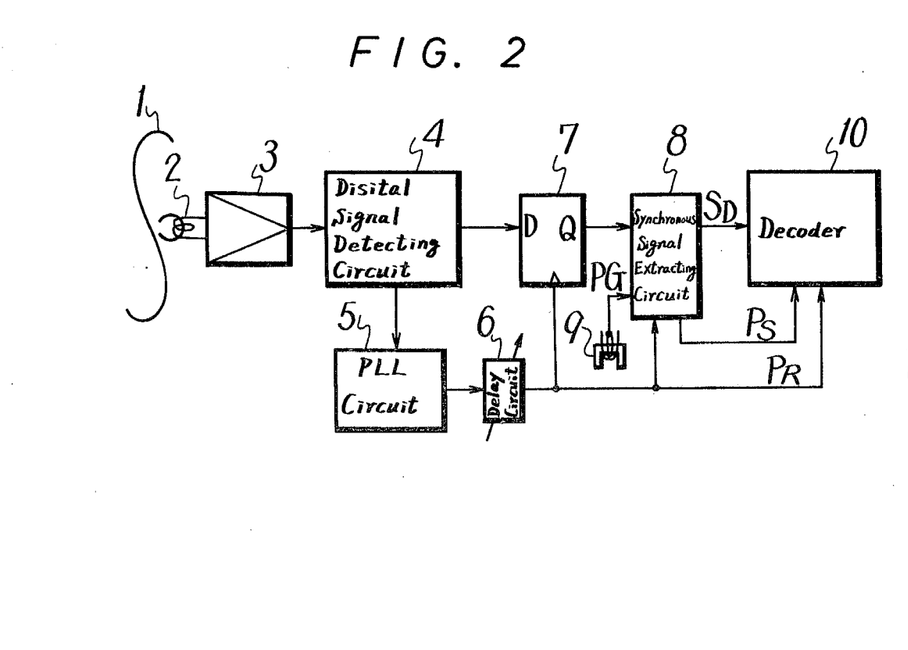
FIG. 2 is a block diagram of a playback system of DVTR.

FIG. 2 shows a basic circuit arrangement of a playback system of DVTR. A signal recorded on a record medium 1 with the data format shown in FIG. 1 is detected by a head 2 and then amplified by a playback amplifier 3. The signal thus amplified is supplied to a digital signal detecting circuit 4 to reproduce a data signal. The data signal is supplied to a PLL circuit 5 which performs bit synchronization, by reproducing a master clock signal, the reference pulse signal $P_R$ shown in FIGS. 3A and 3B. The reference pulse signal $P_R$ has a duty cycle of about 50%, but FIGS. 3A and 3B only show the timing of the leading edge of each pulse of that signal. The reference pulse signal $P_R$ and a data signal $S_D$ recorded on the tape have the phase relation at the time of recording shown in FIG. 3A. In order to decrease the chance that jitter will adversely affect the reproduction of the data signal, the reference pulse signal $P_R$ is supplied to a delay circuit 6 to change the phase relation shown in FIG. 3A to the phase relation shown in FIG. 3B. This causes the leading edge of most reference pulses $P_R$ to occur near the middle of their related bit within the data signal $S_D$, so that if the relative position of the reference pulse signal $P_R$ and the data signal $S_D$ is shifted slightly, such as by jitter, the leading edge will still occur during the proper bit of the signal $S_D$.

Figure 3A:
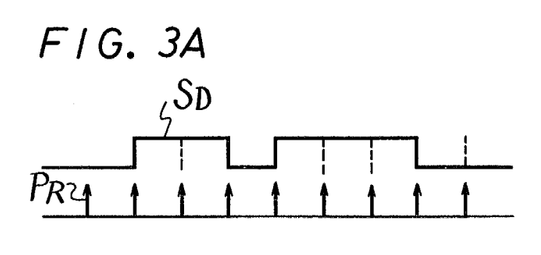
FIGS. 3A and 3B are waveform diagrams for explaining the timing relationships between certain signals of the system shown in FIG. 2.
Figure 3B:
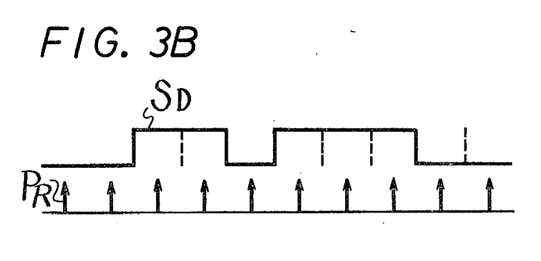

The data signal delivered from the digital signal detecting circuit 4 is supplied to a data signal phase adjusting circuit, for example, a D type flipflop circuit 7 where the data signal is sampled and stored at each leading edge of the reference pulse signal $P_R$ delivered from the delay circuit 6. As a result, the data signal $S_D$ delivered from the output of the flipflop circuit 7 and the reference pulse signal $P_R$ have the same phase relation as they do when the signal $S_D$ was recorded, as shown in FIG. 3A.

A synchronous signal extracting circuit 8 functions to extract the sync bit pattern from the data signal $S_D$ delivered from the flipflop circuit 7. The extracting circuit 8 also receives the reference pulse signal $P_R$ from the delay circuit 6 and a PG pulse generated by a pulse generator 9 when the transducers of the DVTR first start to read a given track of the recording medium 1. The extracting circuit 8 produces as an output synchronizing, or sync, pulses $P_S$. The sync pulses $P_S$, the data signal $S_D$, and the reference pulse signal $P_R$ are supplied to a decoder 10, which converts the data signal $S_D$, supplied from the flipflop circuit 7 through the synchronous signal extracting circuit 8, into video signal based on the timing of the sync pulses $P_S$. A video signal is transmitted to a video processor (not shown) which performs error correction, time base correction, or the like.

A preferred embodiments of the invention will now be described with reference to FIGS. 4 to 10.

Figure 4:
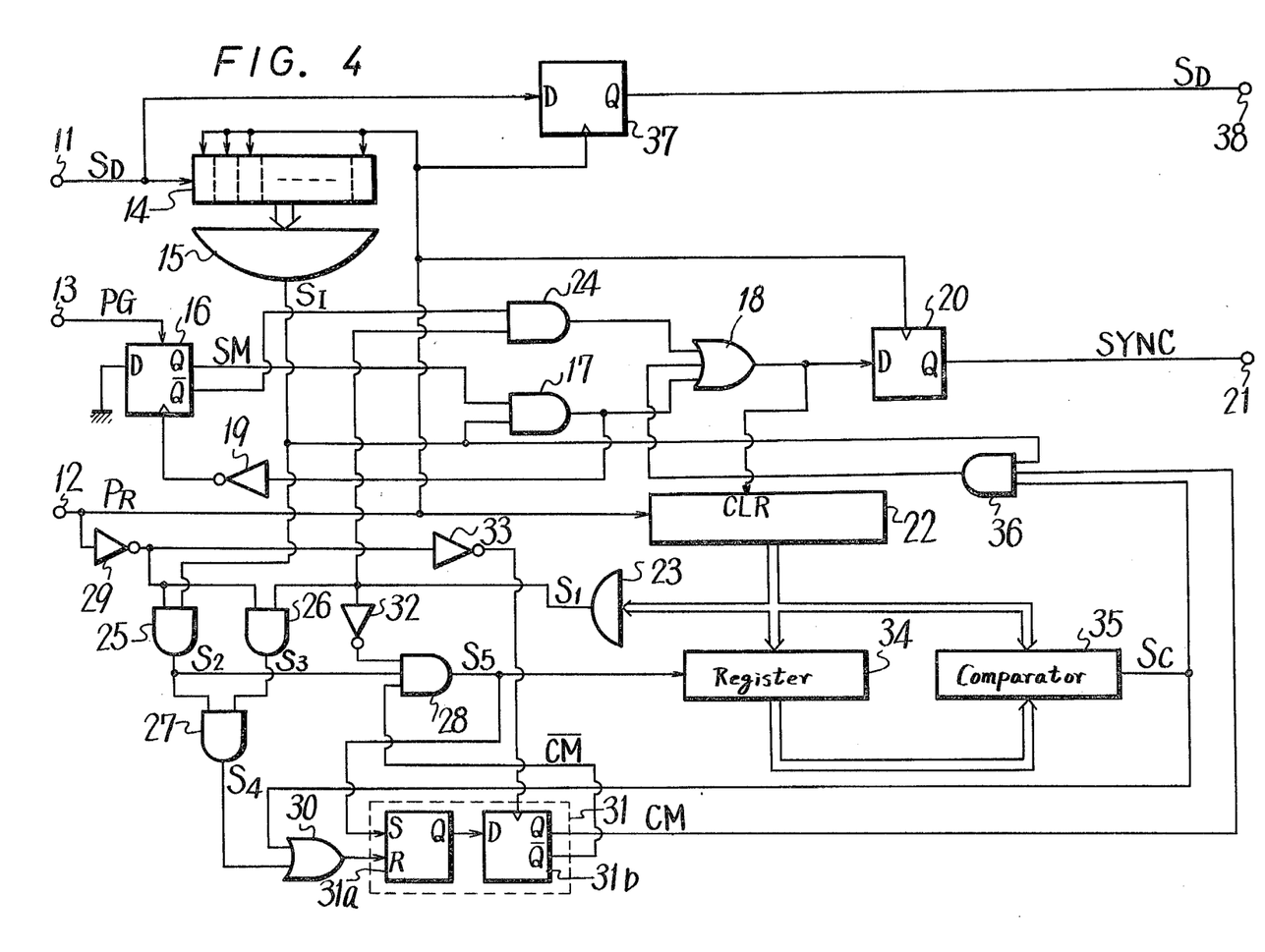
FIG. 4 is a block diagram of a preferred embodiment of the present invention.

FIG. 4 shows a circuit arrangement of a block sync signal extracting circuit according to the present invention. In FIG. 4, to an input terminal 11 is supplied the continuous in phase data signal $S_D$ delivered from the output of the flip flop circuit 7 shown in FIG. 2. To input terminal 12 is supplied the reference pulse signal $P_R$ delivered from the output side of the delay circuit 6 shown in FIG. 2. In addition, to an input terminal 13 is supplied the PG pulse, which is delivered from the pulse generator 9 shown in FIG. 2 when the transducer of the DVTR first start to read a given track of the recording medium 1.

Reference numeral 14 designates a shift register operative to successively shift in the bits of the data signal $S_D$ delivered from the input terminal 11 in response to the reference pulse signal $P_R$ delivered from the input terminal 12. Reference numeral 15 designates a decoder operative to detect when the bit pattern in shift register 14 corresponds to the predetermined sync bit pattern which is supposed to be recorded once in each of the successive blocks of N bits recorded on recording medium 1. The decoder 15 generates a detected sync signal $S_I$ whenever such a correspondence is detected.

Reference numeral 16 designates a search mode setting circuit which, in conjunction with an AND gate 17, is operative to search a given track of recorded information for the first detected sync signal delivered from the decoder 15 after the pulse $P_G$ indicates the reading of such a track has begun. This first sync signal marks the start of the first block on each track. The search mode setting circuit 16, is composed of a D type flipflop circuit, for example, which is set by the pulse $P_G$ to cause the apparatus of FIG. 4 to operate in the search mode. Reference numeral 17 designates an AND circuit which is connected to the Q output of flipflop 16 and which is operative to open its gate during the search mode when the Q output of flipflop 16 is high, causing the detected sync signal $S_I$ to pass therethrough. An output from the AND circuit 17 is supplied to one input terminal of an OR circuit 18 and is fed back through an inverter 19 to the flipflop circuit 16 so as to reset that flipflop and, thus, to end the search mode.

Reference numeral 20 designates a phase adjusting circuit such, for example, as a D type flipflop circuit, operative to produce a block synchronization signal SYNC that is in phase with the reference pulse signal $P_R$ in response to any signals passed through OR circuit 18, such as the above mentioned detected sync signal $S_I$ supplied through AND gate 17. The block synchronization signal SYNC is transmitted through an output terminal 21 to the decoder 10 as the signal $P_S$ shown in FIG. 2.

Reference numeral 22 designates a N counter operative to repeatedly count from 0 to $N-1$ in response to the pulses of the reference pulse signal $P_R$ delivered from the input terminal 12, each of which pulses corresponds to the receipt of one bit from the digital signal $S_D$. The N counter 22 is cleared by the output of the OR gate 18 each time a SYNC signal is generated, and once cleared it continues counting reference pulses $P_R$. Reference numeral 23 designates a decoder operative to supply a counted sync signal $S_1$ when, and only when, the count of N counter 22 attains a value of $N-1$. Reference numeral 24 designates an AND circuit which receives both the output of decoder 23 and the $\overline{Q}$ output of flipflop 16, and which supplies the output delivered from the decoder 23 to the OR circuit 18 when counter 22 has a count of $N-1$, provided that flipflop 16 is not set to the search mode.

Reference numerals 25 and 26 designate AND circuits provided for the purpose of narrowing the duration of the signals which pass through them so as to decrease the chance that such signals will overlap in time with other signals in an undesirable manner causing mis-operation of the apparatus of FIG. 4. To one of input terminals of each of the AND circuits 25 and 26 is supplied through an inverter 29 the reference pulse signal $P_R$ from the input terminal 12. To the other input terminals of the AND circuits 25 and 26 are supplied the outputs from the decoders 15 and 23, respectively. The output terminals of the AND circuits 25 and 26 are connected to input terminals of an AND circuit 27, whose output terminal is connected through an OR circuit 30 to a reset terminal R of a check mode setting circuit 31, to be described later. A first input terminal of an AND circuit 28 is connected through an inverter 32 to the output terminal of the decoder 23 and a second input terminal of the AND circuit 28 is connected to an output terminal of the AND circuit 25.

The check mode setting circuit 31 is composed, for example, of an RS type flipflop circuit 31a and a D type flipflop circuit 31b. The D type flipflop circuit 31b is provided for the purpose of delaying the output from the RS type flipflop circuit 31a until the beginning of the next reference pulse signal $P_R$. A set terminal S of the flipflop circuit 31a is connected to the output terminal of the AND circuit 28 and an output terminal Q of the flipflop circuit 31a is connected to an input terminal D of the flipflop circuit 31b of the next stage. If the detected sync signal $S_I$ is delivered from the decoder 15 when the count of counter 22 is other than $N-1$, AND circuit 28 sets the check mode setting circuit 31 to the check mode in which the output Q of flipflop 31b is high, unless circuit 31 already is in the check mode. In the check mode the apparatus of FIG. 4 checks whether or not the detected sync signal $S_I$ are occurring periodically at a timing different than that indicated by the count in counter 22. The maximum duration of this check mode is one block duration or N pulses in the reference pulse signal $P_R$. An output terminal $\overline{Q}$ of the flipflop circuit 31b is connected to a third input terminal of the AND circuit 28 so as to prevent the AND circuit 28 from initiating a new check mode before the completion of a previously initiated check mode. In addition, flipflop circuit 31b receives as a clocking pulse the reference pulse $P_R$ throughout the inverters 29 and 33 so as to delay the output from the flipflop circuit 31a until the beginning of the next reference pulse $P_R$. The reference pulse signal $P_R$ may directly be supplied to the flipflop circuit 31b without passing through inverters 29 and 33.

Reference numeral 34 designates a register connected to the outputs of AND circuit 28 and counter 22 for memorizing the count of counter 22 whenever the output of AND gate 28 initiates a check mode in response to an occurrence of the detected sync signal $S_I$ at a time when the count of counter 22 is other than the $N-1$. Reference numeral 35 designates a comparator connected to the outputs of register 34 and counter 22 for comparing the count memorized in the register 34 with the current count in counter 22. An output terminal of the comparator 35 is connected through an OR circuit 30 to a reset terminal R of the flipflop circuit 31a and to a first input terminal of an AND circuit 36. A second input terminal of the AND circuit 36 is connected to the output terminal Q of the flipflop circuit 31b, and a third input terminal of the AND circuit 36 is connected to the output terminal of the decoder 15. If a detected sync signal $S_I$ is generated during the period when the count in counter 22 is the same as the count recorded in register 34 for the first time after the initiation of the check mode, the AND circuit 36 functions to supply the detected sync signal $S_I$ to OR circuit 18, causing flipflop 20 to generate a SYNC signal. The output of gate 36 can be considered a checked detected sync signal, since it is only supplied to OR circuit 18 after it has been checked by the check mode setting circuit 31 and the comparator 35. Comparator 35 and OR circuit 30 cause the flipflop 31a to be reset and the check mode terminated the first time after the initiation of the check mode that the count of counter 22 equals the count recorded in register 34, regardless of whether or not a detected sync signal is generated at this time.

Reference numeral 37 designates a delay circuit, for example, a D type flipflop circuit, which functions to delay the transmission of each bit of the data signal $S_D$ supplied from the input terminal 11 by 1 until the rising edge of the next pulse of the reference pulse signal $P_R$, so as to make the data signal $S_D$ in phase with the block synchronous signal SYNC, which is similarly delayed by the delay circuit 20. The delay circuit 37 supplies the data signal $S_D$ through an output terminal 38 to the decoder 10 shown in FIG. 2.

The operation of the block synchronous signal extracting circuit according to the invention will now be described with reference to the diagrams shown in FIGS. 5 to 10.

Figure 5A:
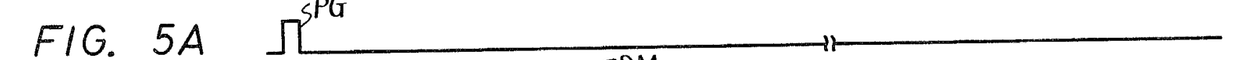
FIGS. 5 to 7 are waveform diagrams for explaining the operation of the embodiment of the invention shown in FIG. 4.
Figure 5B:
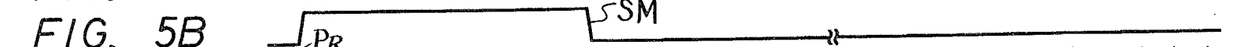
Figure 5C:
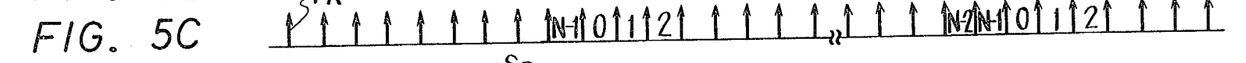

First, the operation of the apparatus of FIG. 4 during the reading of the initial portion of a track of recorded information will be described with reference to FIG. 5. When a transducer of the DVTR first starts to scan a given track the PG pulse shown in FIG. 5A is supplied from the input terminal 13 to the flipflop 16, which sets the flipflop 16 to the search mode and causes it to generate at its output terminal Q a signal SM shown in FIG. 5B. The data signal $S_D$ shown in is supplied from the input terminal 11 to the shift register 14 one bit at a time in synchronism with the reference pulse signal $P_R$ shown in FIG. 5C. The reference numerals added to the time axis in FIG. 5C show approximately the count of the N counter 22. As can be seen by comparing FIG. 5C with FIG. 5D, a count of N bits from 0 to N−1 in counter 22 is associated with the length of one block, each of which is comprised of a sync portion and a data portion.

Figure 5D:
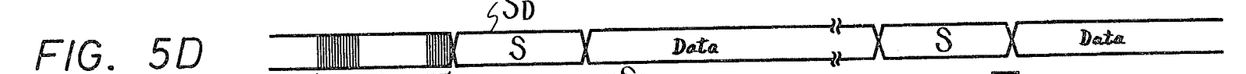
Figure 5E:
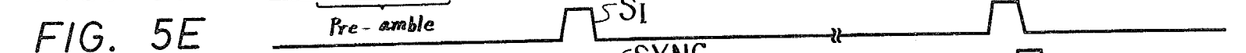
Figure 5F:
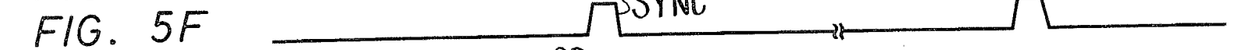
Figure 5G:
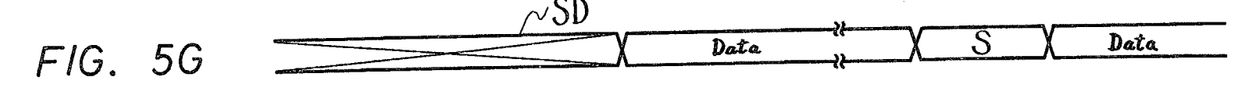

The bits of the data signal $S_D$ are successively shifted into the shift register 14. Whenever the predetermined sync bit pattern of the sync portion of each block of the data signal $S_D$ is detected by the decoder 15 to exist within the shift register 14, the decoder 15 generates to generate the detected sync signal $S_I$ shown in FIG. 5E. The first detected sync signal $S_I$ generated for each track is used as the block synchronous or sync signal. That is the first detected sync signal $S_I$ in each is supplied from the decoder 15 through the AND circuit 17, which is conductive because of the high level of the Q output of flipflop 16 during the search mode, and OR circuit 18 to the flipflop circuit 20, where the detected sync signal $S_I$ is delayed until the beginning of the next reference pulse $P_R$ and then is delivered to the terminal 21 as the first SYNC signal on the recorded information track currently being scanned. The data signal $S_D$ delivered from the input terminal 11 to the output terminal 38 is also delayed until the beginning of the next reference pulse signal $P_R$ by the delay circuit 37, as shown in FIG. 5G, so that SYNC signals will be in phase with the end of each sync portion of each block of the data signal $S_D$ supplied to terminal 38.

During the search mode, the initial portion of the data on a given track is searched exclusively for the purpose of locating the sync bit pattern that marks the start of the first block. The detected sync signal $S_I$ generated when this first sync bit pattern is detected is used to generate the SYNC signal and is also delivered by the output of the OR circuit 18 to the input of the N counter 22, causing that counter to be cleared so that its counting will be synchronized with the timing of the first detected sync signal $S_I$. The first detected sync signal $S_I$ detected during the search mode is also supplied through AND circuit 17 and inverter 19 to the reset input of flipflop 16, which causes the search mode and the signal SM produced at the Q output of flipflop 16, both to end.

Once the search mode ends, the sync extracting mode begins and the N counter 22 is caused to repeatedly count from 0 to N−1 in synchronism with the reference pulse signal $P_R$ by a loop circuit comprising the decoder 23, the AND circuit 24, the OR circuit 18 and the N counter 22. That is, whenever the N counter 22 attains a count of N−1 bits in response to counting the pulses of reference pulse signal $P_R$, the decoder 23 generates a counted sync signal $S_1$. This counted sync signal is delivered through the AND circuit 24 and OR circuit 18, resetting counter 22 to 0 and causing delay circuit 20 to generate a SYNC signal. Thus during the sync extracting mode, when the Q output of flipflop 16 is high and AND gate 24 is turned on the counted sync signal generated when N counter 22 has a count of N−1 is used to produce the SYNC signal $P_S$, which is supplied by the apparatus of FIG. 4 to the decoder 10. This is appropriate, since, if the apparatus of FIG. 4 is properly synchronized with the data signal $S_D$, the counter 22 has the value N−1 only during the period of the reference pulse signal $P_R$ when the last bit of the sync bit pattern which forms a boundary for a given block of data is placed in shift register 14. As is shown in FIG. 5D the portion of each track before the first sync code does not contain blocks of data but rather contains only a preamble used for synchronizing the reference pulse signal $P_R$. As a result, the counted sync signal $S_1$ is without meaning during the search mode, and the gate of the AND circuit 24 is closed by the low output Q of the flipflop circuit 16, during the search mode to prevent the operation of N counter 22 and the decoder 23 from generating SYNC signals at such time.

Referring now to FIGS. 6 and 7, the operation of the apparatus of FIG. 4 in the check mode, which is initiated when a detected sync signal $S_I$ occurs at a time when the counted sync signal $S_1$ does not, will be explained.

Figure 6A:
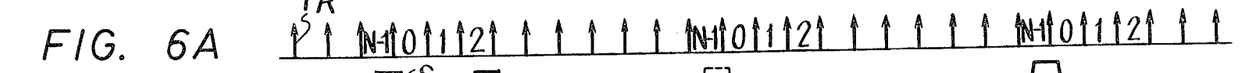
Figure 6B:
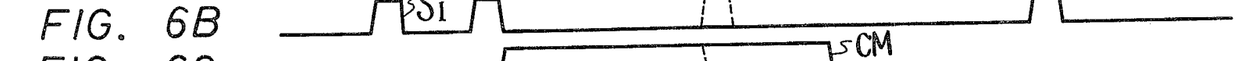

As shown in FIG. 6B, if the detected sync signal $S_I$ is generated when the count in counter 22 is other than N−1, for example, when counter 22 has a count of 2, the detected sync signal $S_I$ is supplied through the AND circuits 25 and 28 to the register 34 causing that register to memorize the count of the N counter 22, in this case the count of 2. At the same time, the output from the AND circuit 28 is also supplied to the set terminal S of the flipflop circuit 31a of the check mode setting circuit 31, which causes the Q output of flip-flop 31b to generate a signal CM, shown in FIG. 6C, at the next pulse of the reference pulse signal $P_R$. During the generation of the signal CM the apparatus of FIG. 4 operates in its check mode in which it checks whether or not the detected sync signal $S_I$ which caused the initiation of the check mode is a correct block sync signal.

Figures 6C, 6D:
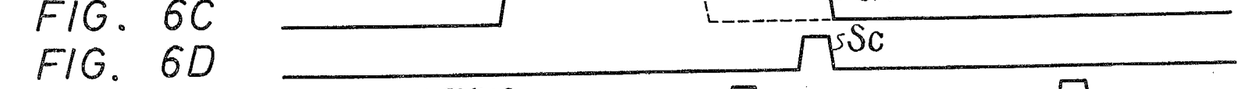
Figure 6E:
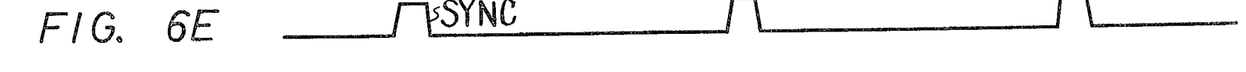

Under such conditions, if a detected sync signal $S_I$ shown by dotted lines in FIG. 6B is obtained from the decoder 15 when the content of the N counter 22 is N−1 the apparatus determines that the detected sync signal obtained at the previous count of 2 bits appeared accidentally, in the example, as a result of bits having the sync bit pattern in the data region of the block, and was not intended as a block sync signal. A detected sync signal $S_I$ occurring at such a time at a count of N−1 during the check mode is passed through the AND circuits 25 and 27 and OR circuit 30 to the reset terminal R of the flipflop circuit 31a, thereby releasing the check mode of the check mode setting circuit 31, as shown by dotted lines in FIG. 6C. If, on the other hand, the detected sync signal $S_I$ is absent when the counter 22 attains a count of N−1 during the check mode, the check mode continues until the count in counter 22 again equals the count which was stored in register 34 at the initiation of the check mode, in the example, the count of 2. If a detected sync signal $S_I$ is not obtained at such a time, the comparative output signal $S_C$ shown in FIG. 6D is delivered from the comparator 35 through the OR circuit 30 to the reset terminal R of the check mode setting circuit 31 so as to release the check mode, and the block sync signal SYNC will be generated at the occurrence of the next counted sync signal $S_1$, as if the check mode had never been initiated. The comparator 35 generates the comparative output signal $S_C$ and releases the check mode irrespective of whether or not the detected sync signal $S_I$ occurs when the count in counter 22 first equals the count memorized in the register 34.

Thus it can be seen that once the initial sync bit pattern within a track has been detected, the circuit of FIG. 4 will generate a SYNC signal $P_S$ every time the counter 22 attains a count of N−1, and at no other time, until two successive sync bit patterns separated by N bits are detected at a count other than N−1, at which time the counter 22 will be reset and the circuit of FIG. 4 is resynchronized to the timing of these two successive sync bit patterns. The circuitry of FIG. 4 will continue to generate a SYNC signal every N bits even if the sync bit pattern cannot be read during later portions of the track as a result of such condition as mis-synchronization, drop-out of the synchronous signal or the like.

Figures 7A, 7B:
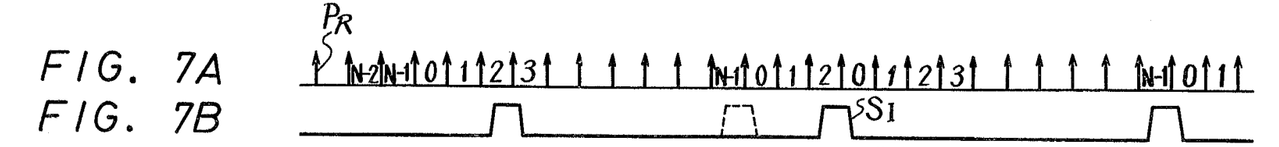
Figures 7C, 7D, 7E:
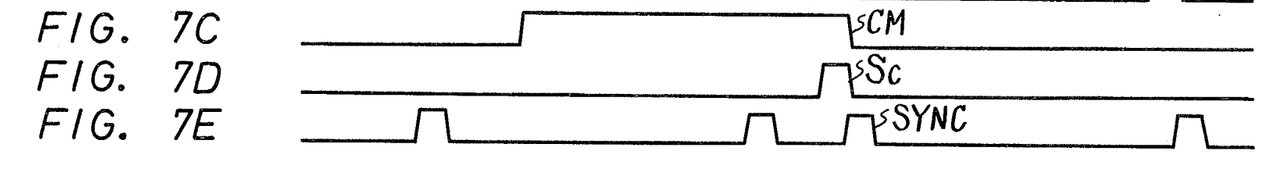

As described above, when the detected sync signal $s_I$ is obtained from the decoder 15 at a given count of counter 22 other than that of the last bit of a block, the detected sync signal $S_I$ is not obtained from the decoder 15 at the final bit, that is, the N−1 th bit of that same block, and a second detected sync signal $S_I$ shown in FIG. 7B is delivered from the decoder 15 at the next time counter 22 has said given count, this second detected sync $S_I$ is immediately delivered as the correct block synchronous signal SYNC, as shown in FIG. 7E. That is, this detected sync signal $S_I$ is supplied through the AND circuit 36, OR circuit 18 and flipflop circuit 20 to the output terminal 21 and then is delivered as the SYNC signal therefrom. To the AND circuit 36 is supplied the signal CM shown in FIG. 7C from the check mode setting circuit 31 which has been brought into the check mode by the previous detected sync signal $S_I$ and the comparative output signal $S_C$ shown in FIG. 7D delivered from the comparator 35 when the count of the counter 22 becomes equal to the count of that counter which was stored in register 34.

Figure 8:
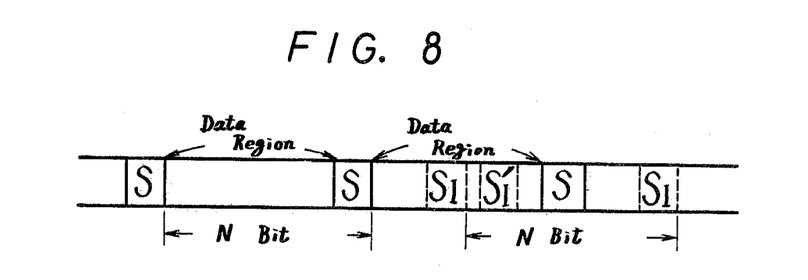
FIG. 8 is a signal timing diagram showing a possible placement of bit patterns that correspond to the sync bit pattern.

At this instant, the output from the comparator 35 is supplied through the OR circuit 30 to the reset terminal R of the flipflop ciruit 31a, and as a result, the check mode of the check mode setting circuit 31 is released as shown in FIG. 7C. In addition, the N counter 22 is cleared by the output from the OR circuit 18, so that the counting of that counter and the generation of subsequent SYNC signal will be synchronized with the timing of the two detected sync signals $S_I$ which were determined by the operation of the circuity of FIG. 4 in the check mode to be association with the detection of correct sync portions of their associated blocks. If a plurality of detected sync signals $S_I$, for example, $S_I$ and $S_I'$ are detected at a count other than N−1 during N successive bits, as shown in FIG. 8, the first $S_I$ is checked, but the next $S_I'$ is not checked, and thus is disregarded. As described above, the first sync bit pattern detected on a track is used to syncronize the reading of that track, and if a second detected sync signal $S_I$ is detected within less than N bits of it, that second detected sync signal $S_I$ alone will not alter the synchronization of the circuitry of FIG. 4.

The operation of the AND circuits 25, 26, and 27, which are provided for the purpose of avoiding malfunctions caused by unwanted overlapping of pulse-shaped signals due to the propagation delays of the integrated circuits, will now be described in greater detail with reference to FIGS. 9 and 10. FIG. 9 shows the case in which a detected sync signal $S_I$ is obtained at the final bit of a block and FIG. 10 shows the case in which the a detected sync signal $S_I$ is obtained at the intermediate bit of a block.

Figure 9A:
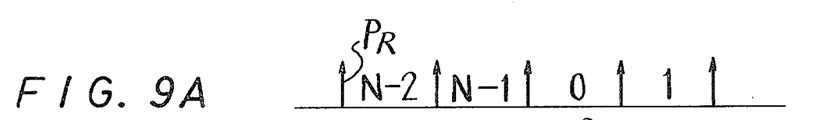
FIGS. 9 to 10 are waveform diagrams for explaining the operation of the embodiment of the invention shown in FIG. 4.
Figure 9B:
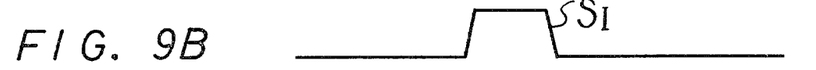
Figure 9C:
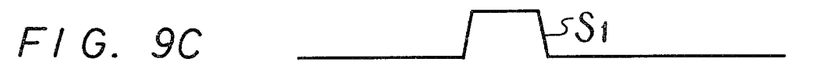
Figure 9D:
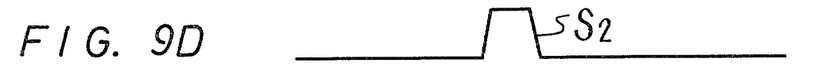
Figure 9E:
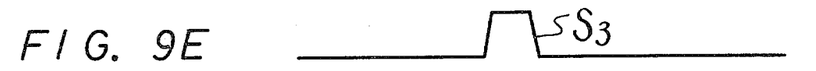
Figure 9F:
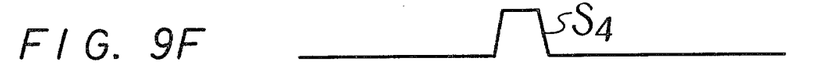
Figure 9G:
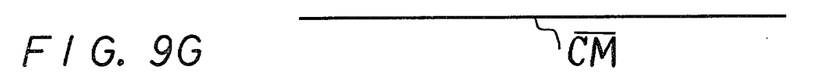

The latter half, that is, the low level portion of the reference pulse signal $P_R$, the leading edge of which signal $P_R$ is shown in FIG. 9A, is delivered from the input terminal 12 and inverted by an inverter 29. The high level signal thus obtained is supplied to the AND circuit 25 which functions to gate the detected sync signal $S_I$ shown in FIG. 9B and deliver from its output a width-narrowed signal $S_2$ shown in the FIG. 9D. Similarly, the counted sync signal $S_1$ shown in FIG. 9C delivered from the decoder 23 is supplied to the AND circuit 26 which functions to gate the signal $S_1$ with the output of inverter 29, and hence obtain a width-narrowed signal $S_3$ shown in FIG. 9E. As a result, the AND circuit 27 functions to generate a signal $S_4$ shown in FIG. 9F at the latter half of the reference pulse $P_R$ if the detected sync signal $S_I$ is obtained during the same period of the reference pulse signal $P_R$ as the count of the N counter 22 reaches N−1.

Figure 9H:
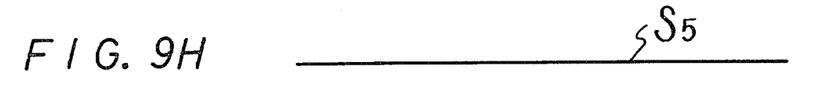

The signal $S_4$ delivered from the AND circuit 27 causes the check mode setting circuit 31 to reset so as to release the check mode. A signal $\overline{CM}$ shown in FIG. 9G and representing an inverted output from the check mode setting circuit 31 maintains a high level. As a result, the AND circuit 28, which generates a high level output when the signal $\overline{CM}$ delivered from the check mode setting circuit 31, the inverted output of the signal $S_1$ delivered from the decoder 23 and the signal $S_2$ delivered from the AND circuit 25 are all high in a level, does not generate a high level input when the detected sync signal is detected during the N−1 count of counter 22. Even though the signal $\overline{CM}$ is high in level at this time, the inverted output of the signal $S_1$ is low in level during the entire duration of the width narrowed signal $S_2$ and thus the output signal $S_5$ from the AND circuit 28, maintains a low level as shown in FIG. 9H. As a result, when the detected sync signal $S_I$ is generated at the final bit, that is, the N−1 th bit, of a block, the check mode setting circuit 31 is not reset so as to bring it into its check mode.

Figure 10A:
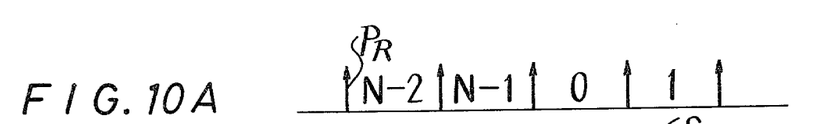
Figure 10B:
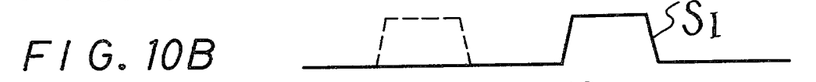
Figures 10C, 10D, 10E:
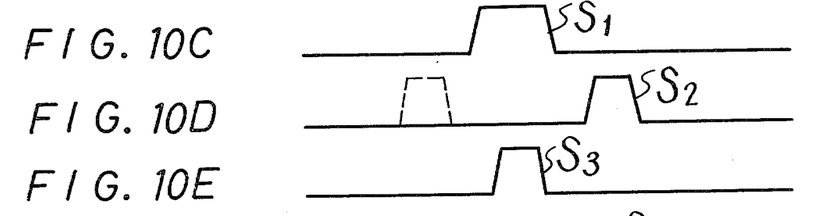
Figure 10F:
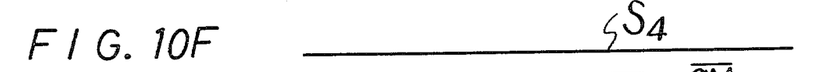

Next, if the decoder 15 delivers a detected sync signal $S_I$ shown by a full line in FIG. 10B when the count of the N counter 22 is any other value than N−1, for example, 0 as shown in FIG. 10A, the AND circuit 25 functions to deliver a width-narrowed signal $S_2$ shown in FIG. 10D. At this time, the output from the decoder 23 is low in level as shown in FIG. 10C and hence the output from the AND circuit 26 is low in level as shown in FIG. 10E and the output from the AND circuit 27 also is low in level as shown in FIG. 10F.

Figures 10G, 10H:
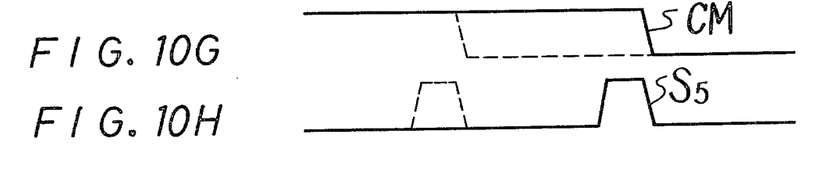

On the one hand, at this time the AND circuit 28 receives a high level output from the inverter 32 when the count of the N counter 22 is other than N−1 and from the inverted output $\overline{CM}$ shown in FIG. 10G from the check mode setting circuit 31 and, as a result, if the AND circuit 28 receives the signal $S_2$ from the AND circuit 25 corresponding to a detected signal signal $S_I$, the AND circuit 28 functions to generate a signal $S_5$ shown in FIG. 10H. The signal $S_5$ from the AND circuit 28 is supplied to the check mode setting circuit 31 so as to set the check mode and is also supplied to the register 34 causing register 34 to memorize the current count of the N-counter 22, 0 in the present example of FIG. 10.

The waveform shown by dotted lines in FIG. 10 show the timing of their respective signal in the case of the detected sync signal $S_I$ is detected when the content of the N counter 22 is N−2.

As described above, the detected sync signal $S_I$ from the decoder 15 and the counted sync signal $S_1$ from the decoder 23 are converted into the width-narrowed signals by means of the AND circuits 25 and 26, respectively, and then passed to the AND circuits 27 and 28. As a result, it is possible to avoid the malfunction caused by undesirable overlapping of pulses due to propagation delay of integrated circuits. For example, in the case shown in dotted lines in FIG. 10 the signal $S_I$ and $S_1$ occur very close to each other in time and stand a very real chance of undesirably overlapping due to propagation delays. But the width-narrowed signals $S_2$ and $S_3$ which are derived from $S_I$ and $S_1$, respectively, are distinctly separated from each other preventing the accidental generation of the signal $S_4$.

Figure 11:
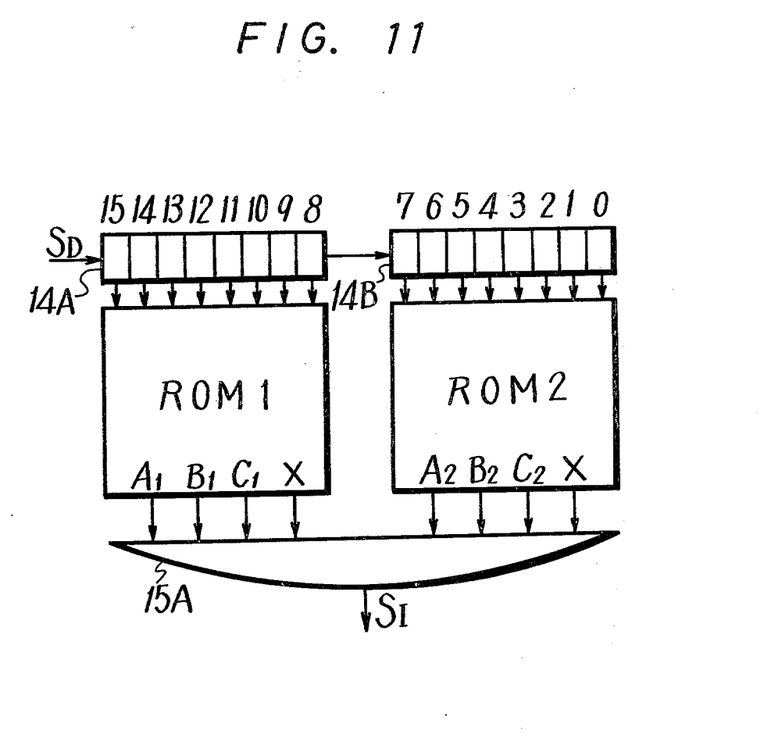
FIG. 11 is a block diagram of another preferred embodiment of one aspect of the present invention.

FIG. 11 shows another embodiment of a portion of the present the invention. In the previous embodiment shown in FIG. 4, the detected sync signal $S_I$ is generated only when each of the bits in shift register 14 corresponds to the corresponding bit of the sync bit pattern. In the embodiment of FIG. 11, the detected sync signal $S_I$ is generated even if the bits in the shift register comprised of shift registers 14a and 14b do not all coincide with the corresponding bits of the sync bit pattern, as long as the number of erroneous bits is smaller than a given number.

In FIG. 11, reference numerals 14A and 14B designate shift registers provided in correspondance with the number with the total number of bits of the sync bit pattern. ROM1 and ROM2 are read only memories which receive the value stored in the shift registers 14A and 14B, respectively, as address inputs 15A is a decoder for deriving the detected sync signal $S_I$ in response to predetermined outputs from the ROM1 and ROM2. The present embodiment shown in FIG. 11 will be described with reference to an example in which the sync bit pattern is composed of 16 bits and the total number of erroneous bits which can be tolerated without preventing the generation of the detected sync signal $S_I$ is 2.

The ROM1 is so patterned that an $A_1$ output is obtained when the 8 bits within shift register 14A completely coincide with the half of the 16 bit sync bit pattern which is received last, a $B_1$ output is obtained when the 8 bits within shift register 14A are different from the last half of the sync bit pattern by any 1 bit, and a $C_1$ output is obtained when the 8 bits within shift register 14A are different from the last half of the sync bit pattern by any 2 bits. In the present embodiment, in which there is an 8 bit address input to ROM1, the number of possible bit patterns in shift register 14A which will cause ROM1 to generate the output $A_1$ is 1, the number of such bit patterns which will cause ROM1 to generate the output $B_1$ is 8, and the number of such bit patterns which will cause ROM1 to generate the output $C_1$ is 28.

The ROM2 is patterned to function in the same manner as the ROM1, except that it functions with regard to the other half of the 16 bit sync bit pattern. In the ROM2, the $A_2$, $B_2$ and $C_2$ outputs correspond to the $A_1$, $B_1$ and $C_1$ outputs of the ROM1.

In the present embodiment, the 16 bits within shift registers 14A and 14B will be considered coincident with the 16 bit sync bit pattern as long as they do not differ from that sync bit pattern by more than 2 bits. As a result, the detected sync signal $S_I$ is generated when the following logical formula (in which addition represents logical ORing and multiplication represents logical ANDing) is true.

$$S_I = A_1(A_2 + B_2 + C_2) + B_1(A_2 + B_2) + C_1 \cdot A_2$$
$$= A_1 \cdot A_2 + (A_1 \cdot B_2 + B_1 \cdot A_2) +$$
$$(A_1 \cdot C_2 + B_1 \cdot B_2 + C_1 \cdot A_2)$$

In the above formula, the first term $A_1 \cdot A_2$ corresponds to the output obtained when 16 bits completely coincide with each other, the second term corresponds to the output obtained when only 1 incoincidence bit is present, and the third term corresponds to the output obtained when only 2 inconcidence bits are present.

As a result, the decoder 15A is composed, for example, of a logic circuit including AND circuit and OR circuits in correspondence with the above formula so as to derive the detected sync signal $S_I$ is the desired situations. The detected sync signal $S_I$ generated by the apparatus of FIG. 11 is employed by the apparatus of FIG. 4 in the same manner as is the signal $S_I$ generated by the shift register 14 and decoder 15 of FIG. 4.

In the above mentioned embodiments, the present invention is described as being applied to a DVTR. The invention is not limited to use with DVTRs, however, and may be applied to any other signal processing apparatus for handling similar data signals.

Although the embodiment of the invention described herein relate to block synchronization in which a frame equals one word, it should be obvious to one skilled in the digital arts that the present invention can be used with other types of synchronization which use sync bit patterns separated by a uniform number of bits.

Having described specific preferred embodiments of the invention with reference to the accompanying drawings, it is to be understood that the invention is not limited to those precise embodiments, and that various other changes and modifications may be effected therein by one skilled in the art without departing from the scope or spirit of this invention as defined in the appended claims.

I claim as my invention:

1. An apparatus for extracting a sync signal from a digital information signal consisting of a plurality of successive blocks each consisting of N successive bits (where N is an integer) and each having a sync portion consisting of a predetermined sync bit pattern and a data portion, said apparatus comprising:

sync pattern detecting means for detecting the occurrence of said sync bit pattern in said information signal and for generating a detected sync signal upon the detection of such an occurrence;

counting means for providing a count having a successive one of N cyclical count values in response to each successive bit of said information signal and for generating a counted sync signal every time said count has a predetermined one of said N cyclical count values; and check mode means for memorizing said count of said counting means when said detected sync signal is generated other than in conjunction with the generation of said counted sync signal and for generating a checked sync signal when a subsequent detected sync signal is generated the next time after the memorization of said count that said counting means equals said memorized count, and for changing the count in said counting means when said checked sync signal is generated so that said counted sync signal will be generated after the counting of each N successive bits of said information signal which follow said subsequent detected sync signal.

2. An apparatus according to claim 1, further including means for generating block sync signals in response to the generation of said counted sync signals and in response to the generation of said checked sync signal.

3. An apparatus according to claim 1, further including means for preventing said check mode means from generating said checked sync signal when said counted and detected sync signals occur in conjunction between the memorization of said count and said next time that said count of said counting means equals said memorized value.

4. An apparatus according to claim 2, wherein said digital information signal is included within a succession of digital bits, and further comprising information top searching means for detecting a beginning of said digital information signal within said succession of digital bits in response to the first said detected sync signal generated by said sync pattern detecting means in response to said succession of digital bits, and for preventing said means for generating block sync signals from generating a block sync signal until said first detected sync signal is generated.

5. An apparatus according to claim 4, wherein said top searching means further includes means for causing said means for generating block sync signals to generate a block sync signal in response to said first detected sync signal, and means for setting the count in said counting means so that said counted sync signal will be generated after the counting of each N successive bits which follow said first detected sync signal.

6. An apparatus according to claim 1, further comprising logic means having a plurality of AND circuits for avoiding undesirable overlapping of logic signals.

7. An apparatus according to claim 1, wherein said sync pattern detecting means comprises a shift-register for serially receiving said information and shifting it sequentially, and a decoder having inputs connected to parallel outputs from said shift-register for generating said detected sync signal when its inputs have a desired value.

8. An apparatus according to claim 7, in which said decoder includes searching means connected to the parallel outputs of said shift register for comparing the output of said shift-register with said sync bit signal and for supplying outputs in accordance with the difference of the two.

9. An apparatus according to claim 8, wherein said searching means consists of Read Only Memory.

* * * * *